United States Patent [19]

Lowrance et al.

[11] Patent Number: 4,513,856
[45] Date of Patent: Apr. 30, 1985

[54] STICK TRANSPORT APPARATUS

[75] Inventors: Thomas F. Lowrance, 3601 Security St., Garland, Tex. 75040; James B. Sharp, Edgewood, Tex.

[73] Assignee: Thomas F. Lowrance, Dallas, Tex.

[21] Appl. No.: 571,595

[22] Filed: Jan. 17, 1984

Related U.S. Application Data

[63] Continuation of Ser. No. 410,979, Aug. 24, 1982, abandoned.

[51] Int. Cl.³ .............................................. B25G 25/00
[52] U.S. Cl. ...................................... 198/695; 227/40; 227/104; 294/103.1
[58] Field of Search ............... 198/479, 653, 694, 695, 198/696; 227/40, 30, 44, 48, 104, 105; 294/103 R, 87 R

[56] References Cited

U.S. PATENT DOCUMENTS

| | | | |
|---|---|---|---|
| 463,370 | 11/1891 | Hunter | 198/695 X |
| 2,166,381 | 7/1939 | Taylor et al. | 198/696 X |
| 2,491,950 | 12/1949 | Bridge | 198/695 X |
| 2,675,753 | 4/1954 | Eber | 198/653 X |
| 3,067,863 | 12/1962 | Schwinger | 198/696 X |
| 3,302,968 | 2/1967 | Bleiman et al. | 294/103 X |
| 3,316,010 | 4/1967 | Lowrance | 294/87 R |
| 3,621,984 | 11/1971 | Grassauer | 198/695 |
| 3,958,685 | 5/1976 | McDonald et al. | 198/694 X |
| 4,180,198 | 12/1979 | Lowrance | 227/120 |

Primary Examiner—Paul A. Bell
Attorney, Agent, or Firm—Peter J. Murphy

[57] ABSTRACT

A transport device includes an elongated housing consisting of parallel spaced bars and end blocks. The housing is mounted for rotation on a pair of conveyor chains by support structure including longitudinally projecting shafts and bushings journaled on the shafts for coupling to the conveyor chain. Adjacent edges of the two housing bars define a support surface for the sticks to be transported. An elongated inner bar is confined between the housing bars for reciprocation, and has an activator rod at one end, extending axially into one of the support shafts and bearing against a cam rotatably mounted transversely at the distal end of that shaft. A spring urges an inner rod into engagement with the cam. The cam is configured to be engaged by support structures associated with the conveyor mechanism, to effect the shifting of the inner rod against the force of the spring. The housing bars have longitudinally spaced aligned pairs of headed pins projecting from the edges defining the support surfaces, each pair of pins defining with the support surface a locating channel for supporting a stick. The inner rod has longitudinally spaced clamping pins projecting from the adjacent edge surface, each pin coacting with an associated pair of headed pins to clamp a stick in the locating channel under the urging of the spring. The inner clamping bar is released by the cam to permit sticks to move into the respective locating channels and to release the sticks from the device.

17 Claims, 10 Drawing Figures

STICK TRANSPORT APPARATUS

This application is a continuation of application Ser. No. 410,979, filed Aug. 24, 1982 now abandoned.

This invention relates to apparatus for engaging and transporting a plurality of sticks or similar elongated articles; and more particularly to apparatus for engaging, transporting and handling a wiener and holder stick assembly in the processing of a product known as a "corn dog".

A popular food product, which is commonly known as a "corn dog", consists of a wiener having a holder stick partially inserted longitudinally therein, the wiener being coated with cornmeal batter for example, and the product being fried in deep fat.

Various types of apparatus have been developed for the handling of the corn dog product and the components thereof to facilitate the high speed production and processing of corn dogs. Examples of such apparatus are described in Lowrance U.S. Pat. No. 3,316,010 issued Apr. 25, 1967, Lowrance U.S. Pat. No. 3,691,608 issued Sept. 19, 1972, Lowrance U.S. Pat. No. 4,069,960 issued Jan. 24, 1978 and Lowrance U.S. Pat. No. 4,180,198 issued Dec. 25, 1979. For the mass production of corn dog products, by the meat packing industry for example, it is desirable to have a machine which performs most of the steps of assembling and processing the corn dog product fully automatically. The basic steps to be accomplished by such a machine may include the handling of wieners and holder sticks and the insertion of the holder sticks into the wieners, the transport of the assembled wieners and sticks for dipping in a cornmeal batter, transport of the assembled wieners and sticks to a cooking vat for deep fat cooking, and the transport of the cooked corn dogs for further processing such as packaging and freezing for example. A very important component of such an automatic machine is a transport device for first engaging and clamping the holder sticks of a plurality of wiener and stick assemblies, and then transporting and handling those assemblies for the further steps of the application of batter and the deep fat frying for example.

A very important feature of such a transport device, from the standpoint of utilization in a high production, durable and reliable machine, is that the transport device have the capability of being incorporated in a continuously moving conveying apparatus, such that the transport device can pick up a plurality of wiener-stick assemblies from a pickup station without interruption of the conveyor movement.

An object of this invention is to provide novel apparatus for use with a continuously moving conveyor to engage and transport a plurality of elongated sticks or similar articles.

Another object of this invention is to provide such apparatus which clamps the sticks very securely for the transport and for the handling of the sticks during subsequent processing steps.

A further object of this invention is to provide such apparatus which enables the rotation of the sticks to different support positions for the subsequent processing of the sticks.

Still another object of this invention is to provide such apparatus which is simple in design, and which is durable and reliable in operation.

Apparatus for accomplishing these objects includes an elongated housing having support means at each end for mounting the housing on a conveyor. The housing has means defining a support surface; and has a plurality of longitudinally spaced abuttments projecting from that support surface; and each abuttment defines, with the support surface, a transversely aligned locating channel for an elongated article. An elongated clamping member is mounted for reciprocating movement in the housing. A spring urges the clamping member in one direction, and a cam mounted in the housing moves the clamping member in the other direction. A plurality of longitudinally spaced clamping fingers project from the clamping member and beyond the support surface, and each clamping member is disposed in confronting relation with one of the abuttment members. Under the urging of the spring, the clamping fingers are urged toward respective abuttment members to clamp elongated articles in the locating channels. More particularly, the housing mounting means may include longitudinally projecting shafts journaling bushings which are mounted to a conveyor chain, enabling rotation of the housing relative to the chain; and the housing includes an anti-rotation member for coaction with conveyor apparatus to control the rotational orientation of the holder.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
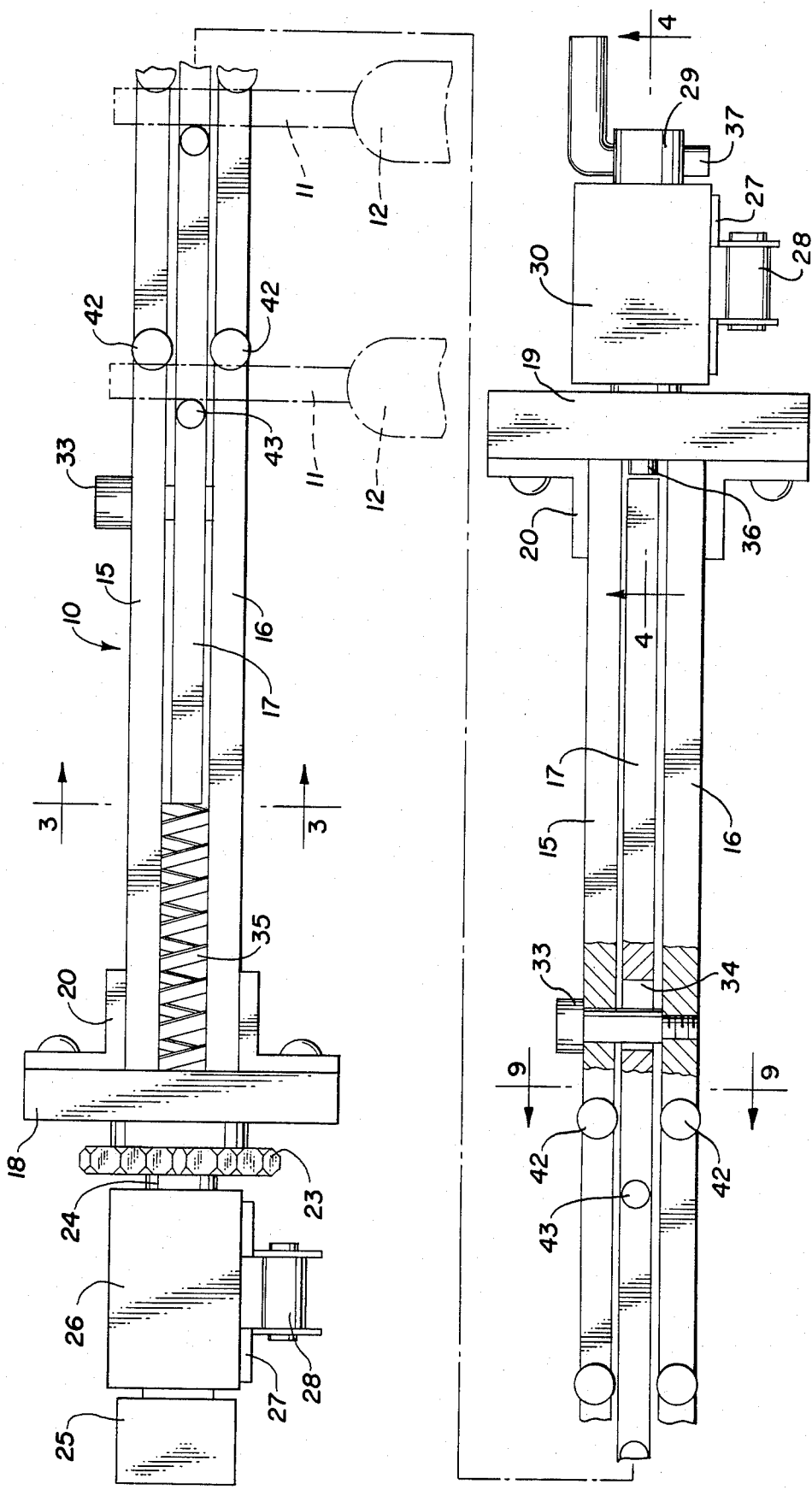
FIG. 1 is an elevation view of apparatus according to the invention, illustrated in position to suspend a plurality of corn dogs.
Figure 2:
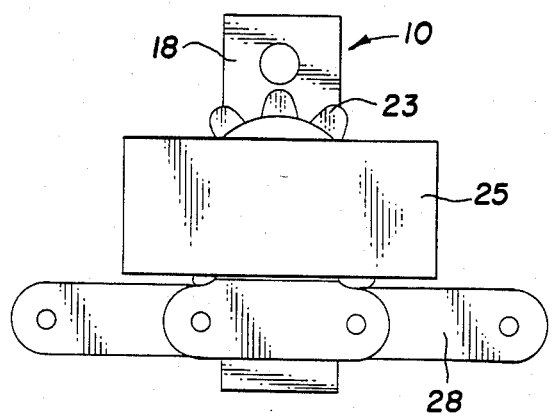
FIG. 2 is an end elevation view of the apparatus of FIG. 1, as viewed from the left end thereof.
Figure 3:
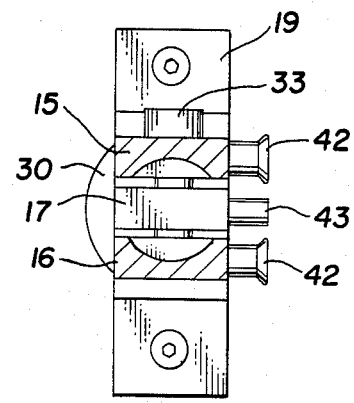
FIG. 3 is a sectional view taken along the line 3—3 of FIG. 1.
Figure 4:
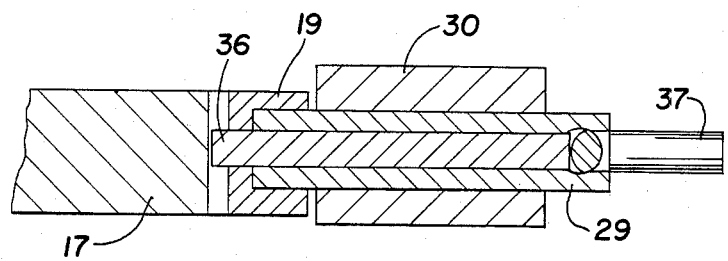
FIG. 4 is a fragmentary sectional view taken along the line 4—4 of FIG. 1.

FIG. 1 is an elevation view of an elongated holding and transport device 10 for engaging the sticks 11 of an assembled corn dog product consisting of a wiener 12 with a stick 11 partially inserted longitudinally therein. This stick holder and transport device will be referred to herein as a stick holder. This stick holder 10 is adapted to be used with automatic apparatus where a plurality of stick holders are supported on conveyor chains for example to transport the corn dogs through the apparatus for several operations to be performed thereon. The automatic apparatus may also include means for inserting the sticks into the wieners, and means for supporting the assembled sticks and wieners in position to be picked up by the stick holder 10, as will be described, while the stick holders are being conveyed at a continuous rate past a stick pickup plane in such apparatus.

As seen in the drawings, the stick holder is an assembly of three spaced parallel bars, rectangular in cross section, including outer bars 15 and 16 and an inner bar 17. The outer bars are rigidly secured together in spaced relation by means of end blocks 18 and 19 and associated brackets 20 to form a housing, with the outer bars being preferably welded to the brackets 20.

Support structures, for mounting the ends of the stick holder housing on a pair of conveyor chains, are provided on the end blocks 18 and 19 as extensions of the stick holder. The support structure associated with the left end block 18 includes a sprocket 23, a journal shaft 24 and an anti-rotation block 25. This structure is rigidly joined to the end block 18 for rotation with the stick holder, with the anti-rotation block being pinned to the end of the journal shaft. A cylindrical bushing 26, preferably fabricated from a material such as nylon, is mounted on the journal shaft for relative rotation; and this bushing includes one flatted side to which is secured a mounting bracket 27 associated with a roller conveyor chain 28 for example. The support structure associated with the right end block 19 includes a journal shaft 29 having an axial bore therethrough, and a bushing 30, identical to the bushing 26 for securing to a parallel run of a conveyor chain 28 by means of an associated bracket 27. The bushing is retained on the shaft 29 by structure to be described subsequently.

The inner bar 17 of the stick holder is confined between the outer bars for limited reciprocating movement; and is supported therebetween by a plurality of shoulder bolts 33 which extend through one outer bar and are threaded into the opposite outer bar, and pass through elongated slots 34 in the inner bar. The inner bar is biased toward the right, as viewed in FIG. 1, by a compression spring 35 which is confined in suitable recesses provided in the inner faces of the outer bar. A round activator bar 36 is rigidly attached to the right hand end of the inner bar 17, as an extension thereof, and extends through the bore of the journal shaft 29. An activator cam 37 is formed from an L-shaped cylindrical rod, and has a cam surface 38 formed on one leg thereof. That one leg extends through a transverse bore 39 at the distal end of the journal shaft 29 for rotation therein, and is retained therein by a suitable roll pin. This cam 37 provides the structure for retaining the bushing 30, as well as providing a control function for the holder bar.

Figure 5:
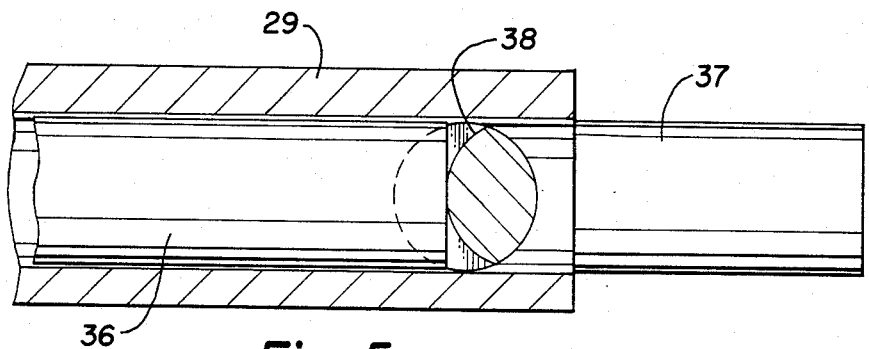
FIGS. 5 and 6 are enlarged fragmentary sectional views, based on FIG. 4, illustrating the cam action for operating the apparatus.
Figure 6:
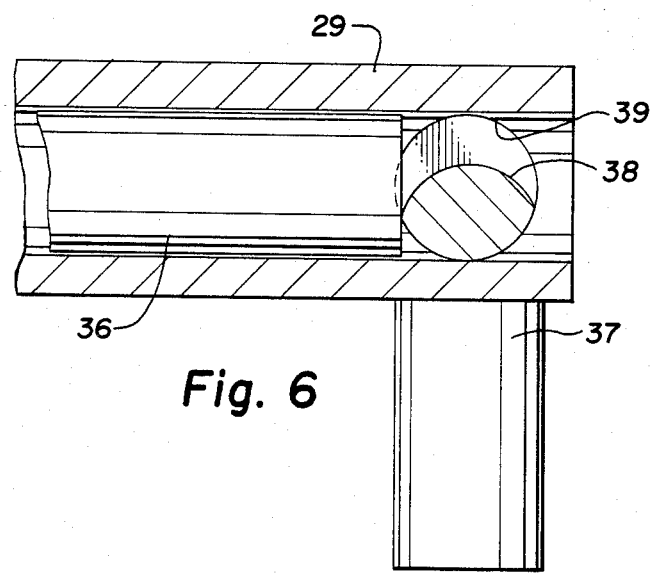

FIGS. 5 and 6 of the drawing illustrate the control function of the activator cam 37. FIG. 5 illustrates the normal position of the cam which occurs as a result of the coaction of the spring biased inner bar acting on the cam surface 38. In this condition the inner bar is urged to the right hand limit of its movement, as viewed in the drawings, and the activator cam is rotated to the FIG. 5 position with the control leg aligned with the longitudinal axis of the holder bar. During the movement of the holder bar by the conveyor chain 28 the control leg of the activator cam will engage a suitable camming structure to rotate the cam 90° to the position illustrated in FIG. 6. In this position the inner bar 17 is shifted to the left against the force of the biasing spring 35; and will remain in this position until the cam control leg is released. Due to the coaction of the cam surface 38 and the distal end of the activator rod 36, the cam 37 will return automatically to the FIG. 5 position as soon as the control leg is released.

Figure 7:
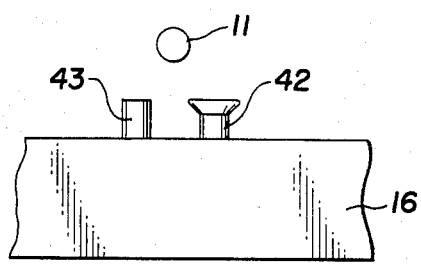
FIG. 7 is a fragmentary view from the bottom of the apparatus as viewed in FIG. 1, illustrating the approach of the holder apparatus to a corn dog stick.
Figure 8:
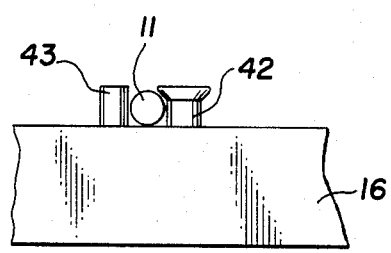
FIG. 8 is a fragmentary view similar to FIG. 7, illustrating the clamping of a corn dog stick.

The clamping operation of the stick holder 10 is particularly illustrated in FIGS. 7 and 8. A planar support surface of the stick holder housing is defined by the adjacent edges of the housing bars 15 and 16. A plurality of pairs of transversely aligned headed pins 42 are mounted on the respective edge surfaces of the housing bars; and each pair of these pins is aligned perpendicular to the longitudinal axis of the housing and defines an abutment which coacts with the housing support surface to provide a locating channel for sticks 11 to be clamped in the stick holder. The headed pins are configured, relative to the sticks 11 so that when the sticks are confined as viewed in FIG. 8 they will be retained against movement away from the housing support surface. A plurality of pins 43 are mounted on the inner clamping bar 17 to project from the adjacent edge of that clamping bar and through the above mentioned support plane to be generally co-extensive with the headed pins 42. These pins 42 define clamping fingers of the clamping bar 17; and one clamping finger 43 is associated with each abutment defined by a pair of headed pins 42. FIG. 8 illustrates the normal relative position of the pins 42 and 43 when the clamping bar 17 is in the normal position illustrated in FIGS. 1 and 5. In this position, the pins are so related that a stick 11 is urged by the clamping pin 43 into the locating channel defined by the headed pins 42; and the stick is thereby confined and rigidly retained by the stick holder. FIG. 7 illustrates the relative position of the clamping pin 43 when the clamping bar is shifted to the left, in FIG. 1, by the action of the activator cam 37. In this condition the clamping pin 43 is spaced sufficiently from the headed pins 42 to allow ready movement of a stick 11 into the clamping position.

In a preferred use of the stick holder 10, a plurality of stick holders will be mounted on parallel runs 28 of a conveyor chain in a transport path, the stick holders being moved at a continuous rate of speed by the conveyor chain. The holder sticks 11 of the assembled wieners and sticks will be disposed in a common pickup plane which is perpendicular to the conveyor path; and the sticks will be appropriately spaced to be engaged by the respective abutments and clamping fingers of the stick holder. The stick holders will be oriented, as they approach the stick pickup plane, that the planar support surface illustrated in FIG. 1 will be the leading faces of the stick holders and will be disposed parallel to the stick pickup plane. As a stick holder 10 approaches the pickup plane, the control leg on the activator cam will engage a fixed abutment associated with the conveyor support structure, to effect the rotation of the cam to the FIG. 6 position, to move the clamping fingers 42 to the left as viewed in FIG. 7 allowing the sticks 11 to move into the locating channels when the stick holder support surface reaches the pickup plane. As the stick holder moves into the pickup plane, the sticks 11 will be deflected slightly by the heads of the abutment pins as they move into the locating channel. The timing will be such that as soon as the sticks have moved into the locating channels, the control leg of the activator cam will be released from the fixed deflecting abutment allowing the clamping bar 17 to shift the clamping fingers 43 to the right and securely clamp the sticks as illustrated in FIG. 8.

Figure 9:
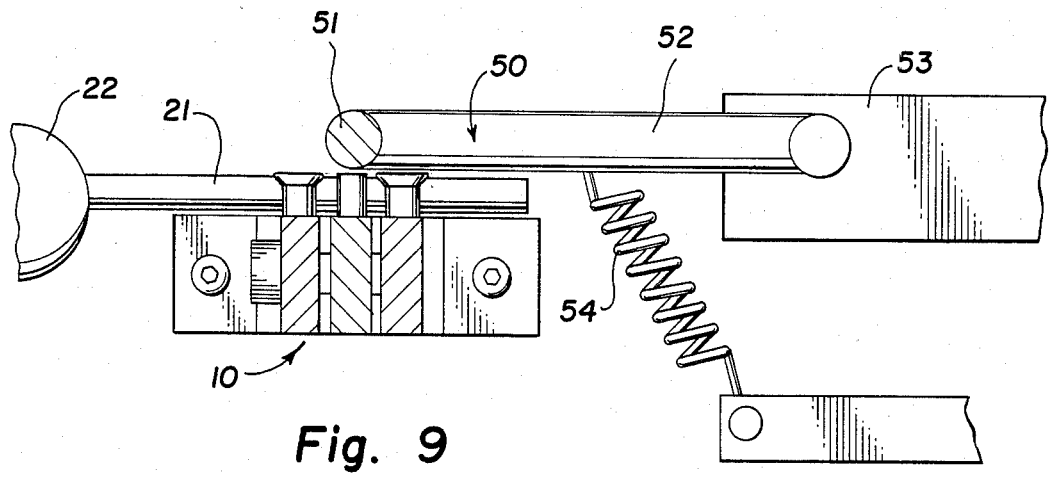
FIG. 9 is a sectional view of the apparatus of FIG. 1, taken along the line 9—9 of FIG. 1, illustrating the coaction of the holder apparatus with a hold down bar.

To improve the reliability of the stick holder clamping operation, by assuring that the sticks 11 will not be displaced from the clamping position prior to the shifting of the clamping fingers 43, a hold down bar may be provided for coaction with the stick holders. FIG. 9 of the drawing illustrates the action of such a hold down bar 50. This hold down bar consists of an elongated cylindrical rod 51, for example, having transverse arms 52 for pivotally supporting the hold down bar in the apparatus frame by suitable brackets 53. In this illustrated use, the pickup plane for the sticks 11 is a horizontal plane, and the stick holders are moving upwardly in a vertical path. The hold down bar is biased to a downward limiting position by means of one or more tension springs 54, in which position the rod 51 is disposed in the stick holder path just above the pickup plane and overlying the several sticks 11. When the stick holder reaches the pickup plane, the sticks are held against the support surface of the stick holder while the activator cam is released to effect the clamping of the several sticks. With continued upward movement of the stick holder, the hold down bar is rotated clockwise out of the path of the stick holder and confined sticks; and returned to its limit position by the spring when the stick holder has cleared the path of the hold down bar.

Figure 10:
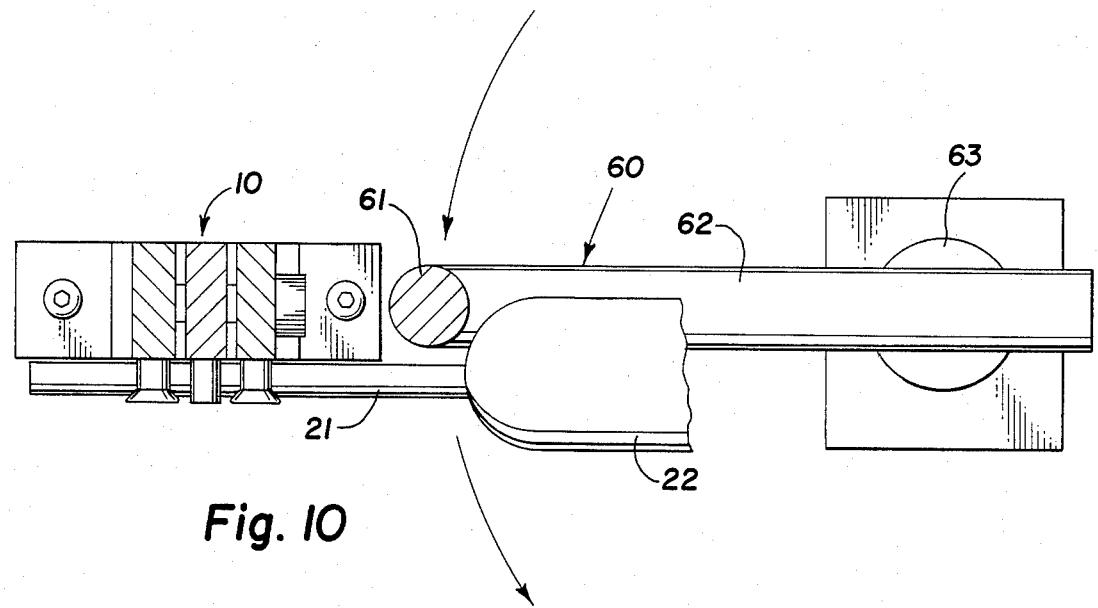
FIG. 10 is a sectional view of the apparatus of FIG. 1, taken along the line 9—9 thereof, illustrating a release assist mechanism to facilitate release of clamped sticks from the apparatus.

FIG. 10 of the drawing illustrates a release bar 60 for coaction with the stick holders 10 to assure the release of the corn dogs from the stick holders at the discharge end of the apparatus with which the stick holders are used. FIG. 10 is a sectional view through the stick holder which may be taken in the same plane as FIG. 9. At the discharge station, the stick holders have been rotated to support the corn dogs in a horizontal plane with the support surface facing downward, so that when the clamping fingers are released, the corn dogs will drop to a chute for example to be collected for packaging. Because the clamping force is quite large, and because the sticks may be fabricated from plastic, paper or from wood or from some other material which is quite resilient, it is possible that the stick will remain locked in a locating channel under the heads of abutment pins 42, when the pin 43 is moved away.

To assure the release of all corn dogs or other sticks from a stick holder, at a discharge station, the apparatus with which the stick holders are used may include a rotating release bar at the discharge station. FIG. 10 illustrates such a release bar 60 consisting of an elongated rod 61 having a length generally coextensive with the length of a stick holder 10, having transverse arms 62 at the ends thereof, and having anchoring support shafts 63 at the distal ends of both arms extending parallel with the rod 61. The support shafts 63 would be suitably supported for rotation within the apparatus, and a suitable rotating drive means would be coupled to one of the support shafts. The release bar 60 would be rotated in a counterclockwise direction as viewed in FIG. 10; and the rotation would be timed that the rod 61 would rotate through the plane of the sticks 11 immediately following the opening of the stick holder through engagement of the activator cam 37 by a suitable abutment. In this manner the efficiency and reliability of the apparatus including the stick holders is improved.

As has been described, the stick holders 10 are rotatably supported relative to the conveyor system consisting of the chain 28 and bushings 26. As has also been described, the stick holders are oriented in different positions as they are conveyed along the apparatus. In the stick pickup plane, the support surfaces of the stick holders are facing upward; and in the stick discharge plane, the support surfaces are facing downward. Since the stick holders are freely rotatable within the support bushings 26 and 30, means must be provided for orienting the holders relative to the associated apparatus. The anti-rotation blocks 25 perform one part of this function, these blocks being elongated and being positioned for coacting sliding relation with an elongated guide track of the apparatus. As mentioned, the end block 18, the sprockets 23, the journal shaft 24, and the anti-rotation blocks 25 are fabricated as a rigid assembly. When it is desired to rotate the stick holder 10 to a different position, a sprocket guide, in the form of a section of roller chain, for example, is provided on the apparatus, and a desired number of chain links are presented to the sprocket to effect the desired angle of rotation such as 180° or 360°. At the location of the sprocket guides, there must be an associated gap or recess in the guide track to allow the rotation of the anti-rotation block 25.

What has been described is a novel stick holder apparatus, for use in an automatic processing machine, for picking up, clamping, transporting, and positioning elongated sticks or similar articles. A particular feature and advantage of the stick holders of the invention is that they may be employed in a continuously moving conveyor, function to very reliably pickup sticks which are supported in a pickup plane, and hold those sticks very rigidly and securely as they are transported for further processing. A related feature of the invention is that the apparatus is simple and rugged in design, and very effective and reliable in operation.

While the preferred embodiment of the invention has been illustrated and described, it will be understood by those skilled in the art that changes and modifications may be resorted to without departing from the spirit and scope of the invention.

What is claimed is:

1. A device for receiving and clamping a plurality of rod-like articles in fixed relationship comprising
   an elongated housing having mounting means at each end; said housing having means on one side defining support surfaces, disposed in a common plane, for a plurality of longitudinally spaced, transversely oriented rod-like articles;
   a plurality of longitudinally spaced abutment means projecting from said one side of said housing transverse to and beyond said support surfaces plane; each abutment means defining, with an associated support surface, a locating channel oriented transverse to said elongated housing for locating a single one of said rod-like articles in said transverse orientation;
   an elongated clamping member mounted in said housing for relative longitudinal reciprocating movement; spring means urging said clamping member in one direction; cam means mounted on said clamping member for engagement by coacting cam means to move said clamping member in the other direction;
   a plurality of longitudinally spaced clamping fingers projecting from said clamping member transverse to and beyond said support surface plane, each disposed in confronting coacting relation with one of said abutment means; and said spring means normally urging said clamping fingers toward respective abutment means, to clamp and confine rod-like articles in respective said locating channels;

said clamping members being movable against the force of said spring means to space said clamping fingers from respective abutment means to define lateral access to said locating channels.

2. A device as set forth in claim 1 each abutment means having means defining a transverse surface transverse to said support surface, and lip means defining a confronting surface confronting said support surface; each support surface together with an associated transverse surface and confronting surface defining said three-sided locating channel.

3. A device as set forth in claim 2 said lip means being narrow, relative to the diameter of said rod-like articles, to enable relative movement of said articles in a path perpendicular to said support surface with minimum deflection to pass said lip means.

4. A device as set forth in claim 1 each of said abutment means comprising a pair of headed pins; said headed pins, together with said support surfaces, defining three-sided locating channels; and each of said clamping fingers comprising a pin projecting from said clamping member.

5. A device as set forth in claim 2 each of said abutment means comprising a pair of headed pins; said headed pins defining said transverse surface and said confronting surface; and each of said clamping fingers comprising a pin projecting from said clamping member.

6. A device as set forth in claim 1 said abutment means and said clamping fingers, when said clamping fingers are moved away from respective abutment means, defining said locating channels open in a direction away from said support surface.

7. A device as set forth in claim 6 said abutment means and said clamping fingers, when said clamping fingers are moved toward respective abutment means, defining said locating channels closed to confine laterally said rod-like articles.

8. A device as set forth in claim 1 said elongated housing including a pair of spaced outer bars; said outer bars defining said support surfaces and carrying said abutment means;

said clamping member comprising an inner bar confined for reciprocating movement between said outer bars and carrying said clamping fingers.

9. A device as set forth in claim 8 said housing mounting means including end blocks joining said outer bars, coaxial stub shafts projecting longitudinally from said end blocks, and bushings journaled on said stub shafts for coupling to conveyor apparatus; said stub shafts and said bushings defining said mounting means; said devices being thereby mounted for rotation about the axis of said stub shafts relative to said conveyor apparatus.

10. A device as set forth in claim 9 said clamping member having a longitudinal pin extension projecting axially through one of said stub shafts, defining said cam means; and said coacting cam means comprising a shaft supported at the distal end of said one stub shaft, for rotation about a transverse axis, and having a cam surface coacting with said cam pin extension.

11. A device as set forth in claim 10 each of said abutment means comprising a pair of headed pins, said pins of each pair projecting from the adjacent support surfaces of respective outer bars; said headed pins, together with support surfaces of said outer bars, defining said three-sided locating channels; and each of said clamping fingers comprising a pin projecting from said inner bar.

12. A device as set forth in claim 1 said cam means comprising a longitudinal extension of said clamping member;

said coacting cam means comprising a shaft mounted for rotation in said housing about an axis transverse to the direction of movement of said clamping member, and having a cam surface formed on said shaft; said clamping member having a follower extension bearing on said cam surface.

13. A device as set forth in claim 12 said coacting cam means including an actuator arm projecting transversely from said shaft;

said cam surface being configured that said cam follower extension, under the urging of said spring means, effects rotation of said cam means to position said arm generally parallel with the longitudinal axis of said housing;

and said cam shaft being rotatable, through engagement of said actuator arm with a suitable abutment to shift said clamping member.

14. A device as set forth in claim 1 said mounting means comprising shafts extending longitudinally from each end of said housing, and bushings journaled on each shaft for connection to a conveyor to enable rotation of said housing relative to said conveyor; and said housing having an anti-rotation member adjacent to one end for coaction with guide means of said conveyor to control the relative rotation of said housing.

15. A device as set forth in claim 1, including in combination apparatus including conveyor means for moving a plurality of successive said devices laterally in a path transverse a pickup plane of said articles, with said support surface planes of said devices oriented parallel to said pickup plane;

an elongated hold down bar mounted on said apparatus for lateral movement into and out of said path and into and out of said pickup plane; said hold down bar being maintained parallel relative to said pickup plane and said path; spring means normally urging said hold down member into a position coinciding approximately with the intersection of said path and said pickup plane and adjacent to said articles supported in said pickup plane;

said devices being conveyed to approach said pickup plane with said support surfaces leading; and said devices engaging said articles supported in said pickup plane, with said hold down bar urging said articles into said locating channels to enable clamping of said articles by said clamping member and said hold down bar being displaced from said path and said pickup by said devices and clamped articles moving beyond said pickup plane.

16. A device as set forth in claim 15 said clamping member spring means urging said clamping member in said one direction to close said three-sided locating channels, and said coacting cam means urging said clamping member in said other direction against the force of said spring to open said locating channels;

and means associated with said conveyor means for actuating said coacting cam means when said device approaches said pickup plane, to open said locating channels to receive said rod-like articles; and means associated with said conveyor means for actuating said coacting cam means to allow the closing of said locating channels to clamp and retain said elongated articles, when said device reaches said pickup plane.

17. A device for receiving and clamping a plurality of rod-like articles in fixed relationship comprising an elongated housing having mounting means at each end; said housing having means on one side defining support surfaces, disposed in a common plane, for a plurality of longitudinally spaced, transversely oriented rod-like articles;

a plurality of longitudinally spaced abutment means projecting from said one side of said housing transverse to and beyond said support surfaces plane; each abutment means defining, with an associated support surface, a transversely oriented, locating channel for confining one of said rod-like articles;

an elongated clamping member mounted in said housing for relative longitudinal reciprocating movement; spring means urging said clamping member in one direction; cam means mounted on said clamping member for engagement by coacting cam means to move said clamping member in the other direction;

a plurality of longitudinally spaced clamping fingers projecting from said clamping member transverse to and beyond said support surface plane, each disposed in confronting relation with one of said abutment means; and said spring means urging said clamping fingers toward respective abutment means, to clamp rod-like articles within said three-sided locating channels;

apparatus including conveyor means for moving a plurality of successive said devices in a path with said housing disposed perpendicular to the direction of movement in said path;

said housings being conveyed to approach a discharge station of said apparatus, with said support surfaces facing downward, and with said elongated articles being supported in generally horizontal planes;

an elongated release bar mounted on said apparatus for movement adjacent to said path at said discharge station, in parallel relation to said devices moving through said discharge station;

and means for moving said release bar downward relative to a said device at said discharge station, to urge said elongated articles downwardly away from said device; and means associated with said conveyor means for actuating said coacting cam means at said discharge station, to release said articles from said device.

* * * * *